Sept. 19, 1961    F. KLUMPP, JR., ET AL    3,001,007
SELF-LOCKING BUSHING

Filed Nov. 13, 1959    4 Sheets-Sheet 1

INVENTORS
Ferdinand Klumpp, Jr.
BY William H. Jemison

Sept. 19, 1961   F. KLUMPP, JR., ET AL   3,001,007
SELF-LOCKING BUSHING
Filed Nov. 13, 1959   4 Sheets-Sheet 4

INVENTORS
Ferdinand Klumpp, Jr.
BY William H. Jemison

United States Patent Office 3,001,007
Patented Sept. 19, 1961

3,001,007
SELF-LOCKING BUSHING
Ferdinand Klumpp, Jr., Union, and William H. Jemison, Berkeley Heights, N.J., assignors to Heyman Manufacturing Company, Kenilworth, N.J., a corporation of New Jersey
Filed Nov. 13, 1959, Ser. No. 852,689
16 Claims. (Cl. 174—153)

Our invention relates to "snap-in" or self-locking bushings molded out of a suitable plastic or other equivalent material.

An example of a type of bushing in the same general class as the improved bushing embodying our invention as claimed herein, is disclosed in Patent No. 2,424,757 issued July 29, 1947 to Ferdinand Klumpp, Jr. Reference might also be made to the respective bushing or grommet designs disclosed in United States Patents Nos. 2,420,-826; 2,424,756; 2,424,758; 2,664,458; 2,668,316; 2,724,-736; 2,799,528; and 2,919,712; and in French Patent No. 1,111,742. A bushing of this type is used extensively for assembly with a sheet-metal panel or plate out of which a hole has been punched. A preferred form such as that disclosed in the aforesaid Patent No. 2,424,757 and having the usual flanged head, is inserted into the hole and pushed through to the point whereat the head is firm against the adjacent side or face of the plate. During this action two or more protruding fingers or equivalent parts or structure functional in the manner of a doorlatch, are pushed or forced inwardly by their camlike engagement with the circular edge of the hole. At the point whereat the head is firm against the adjacent face of the plate the fingers or other parts become free to move outwardly with a snap action, thus to hold the bushing locked in place. In many of the bushing or grommet designs proposed heretofore, some of which are disclosed in the above patents, there are required to be one or more undercuts, thus to make necessary in each case employment of a "split" mold with its inherent disadvantages of being relatively complicated, expensive, and capable only of a rate of product-output substantially less than would be the case were it possible to use a straight mold and to employ automatic operation, using the method or system referred to as injection molding. The respective, novel, structural and operational features of the bushing disclosed and claimed herein are closely related to and dependent upon those of the improved mold disclosed and claimed in our copending application Serial No. 863,370, in the sense that the bushing has all the advantages of those of the prior art while at the same time having structural characteristics making possible use of our novel, "straight" mold for injection molding of the bushing and automatic operation, thus to result in cost per bushing substantially less than has been possible heretofore with the prior bushings having one or more undercuts requiring the use of "split" molds.

One of the objects of our invention resides in the provision of an improved bushing of the character referred to which has all the advantages of ease of assembly with a chassis or other plate out of which a hole has been punched; of providing for complete insulation around the hole; of the flanged head being functional to cause the bushing to hold itself locked tightly to the plate and always firmly and correctly in the hole thus to avoid malfunction such as rattling; of being functional to keep itself firmly locked against dislodgement after once being inserted or assembled; of being relatively easy to manufacture; of requiring a relatively small amount of material thus to allow for lower consumer price; of being functional to accommodate different thicknesses of chassis plate; and of being, simultaneously with the performance of its insulating function, capable of firmly holding together two or more plates, face-to-face.

Another object resides in the provision of a plastic bushing of the character referred to which can be injection-molded and which has all the aforesaid advantages without the necessity for any undercutting and without the necessity for the use of inserts, thus to make it possible to manufacture by injection molding with the operation automatic and to use a straight mold with its recognized advantages over a split mold.

Other objects and advantages will hereinafter appear.

For the purpose of illustrating our invention embodiments thereof are shown in the drawings, wherein

FIGS. 3, 5 and 7 are enlarged, plan views, showing, respectively, structural behavior of and the respective positions or shapes taken or assumed by the various portions and parts of the bushing at three representative stages during assembly with a plate; FIG. 3 being illustrative of an initial stage whereat the bushing has been inserted into the hole in the plate and pushed or forced about half-way through, FIG. 5 being illustrative of that stage whereat the bushing has been pushed all the way in and the resilient head fully sprung to be flat against the adjacent face of the plate, and FIG. 7 being illustrative of the final stage reached upon completion of the assembly operation;

The respective physical characteristics such as tensile strength, elongation, and flexural modulus of portions or parts of our improved bushing as well as those of the bushing considered as a whole, are important attributes which when taken with likewise important dimensional relations result in the bettter performance over comparable bushings of the prior art. Some latitude on choice of material and dimensional relations for the bushing will be apparent. A material found to be particularly satisfactory is the plastic identified in the trade as "DuPont Nylon Resin Zytel 101"; the tensile strength of which, at 73° Fahrenheit, equals approximately 11,800 pounds per square inch, the elongation factor of which, at 73° Fahrenheit (2½% water), is substantially 300%, and the flexural modulus of which, at 73° Fahrenheit (2½% water), is substantially 175,000 pounds per square inch. With regard to any terms hereinafter used, such as those expressive of particular values or degrees of resiliency or springiness, flexibility, etc.; it is to be understood that these are not critical and are considered to be anywhere within a substantial range such as that within which come the aforesaid values of "Zytel 101."

Figure 1:
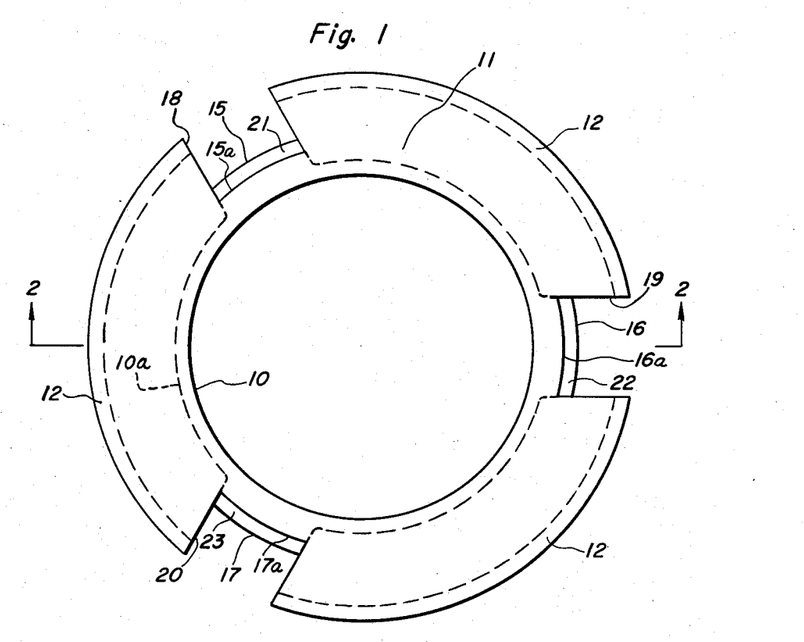
FIG. 1 is an enlarged, plan view of our improved bushing.
Figure 2:
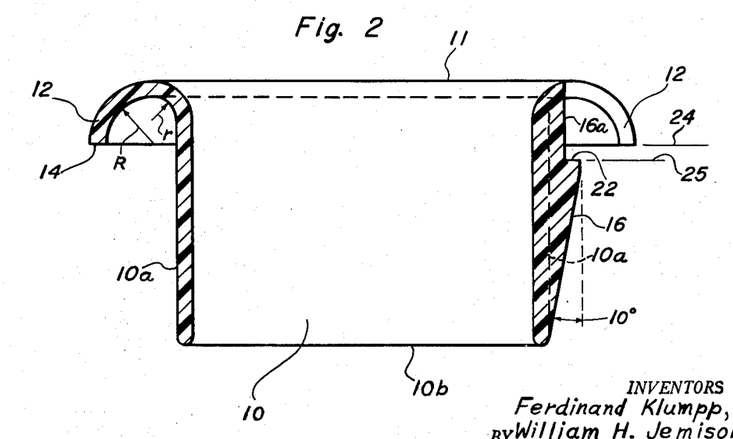
FIG. 2 is a sectional view, the section being taken on theh line 2—2 in FIG. 1.

In FIGS. 1 and 2 there is shown a form of insulating bushing embodying our invention and comprising a relatively flexible, non-split, cylindrical body portion 10, the latter being hollow end-to-end thereof and provided at one of its ends with a head 11 having a relatively high degree of springiness and an arcuate cross-sectional configuration embracing substantially 180°, as shown in FIG. 2. The circular edge of head 11 is in the form of an arcuate flange 12 the peripheral surfaces 14 of which are relatively flat and disposed or arranged to face the adjacent side or face of the plate aforesaid.

Reference numerals 15, 16 and 17 respectively designate three ribs spaced 120° from each other in the direction circumferentially of body portion 10, each rib being raised from the outside cylindrical surface 10a of body portion 10, and each rib extending longitudinally of the latter from the end 10b thereof to head 11.

As shown in FIG. 1 and for the purpose hereinafter explained, head 11 and its flange 12 are provided through the same with U-shape notches 18, 19 and 20 each radially disposed with respect to the longitudinal axis of body portion 10 and each extending to the circular edge of head 11, i.e., to the peripheral surfaces 14 of flange 12. As shown also in FIG. 1, the notches 18, 19 and 20 are aligned respectively with ribs 15, 16 and 17.

Ribs 15, 16 and 17 are stepped, as more clearly shown at the right in FIG. 2, to provide the same respectively with surfaces or steps 21, 22 and 23 which are disposed in opposition with respect to surfaces 14 in the sense that these opposed surfaces are disposed for engagement respectively with the opposite sides or faces of the aforesaid plate, at the hole through the latter.

The plate-engaging surfaces 14 are disposed in a plane designated at 24, and the plate-engaging surfaces 21, 22 and 23 are disposed in a plane designated at 25, each of these planes being perpendicular to the longitudinal axis of body portion 10 and, for the reason or purpose hereinafter explained, being spaced one from the other a distance less than the thickness of the plate, at the hole through the latter.

For the purpose of keeping the bushing centered in the hole, after assembly, the respective surface parts 15a, 16a and 17a of the outside surfaces of ribs 15, 16 and 17 and which are, respectively, between plate-engaging surfaces or steps 21, 22 and 23 and the head 11; are disposed in a cylinder the axis of which is coincident with the axis of the outside cylindrical surface 10a of body portion 10, the diameter of this cylinder being substantially the same as the diameter of the hole into which the bushing has been inserted.

Reference is now made to FIGS. 3, 4, 5, 6, 7 and 8. In assembling the bushing with a panel plate, wall or other structure 26 through which a hole 27 has been punched or otherwise provided, it is first inserted into the hole, generally from the outside or front face 28 of the panel. By thumb or a suitable tool, sufficient force is then applied to head 11 to push body portion 10 all the way through, i.e., to the position shown in FIG. 6, after which the thumb or tool is disengaged to permit the bushing to assume the final position shown in FIG. 8.

Figure 3:
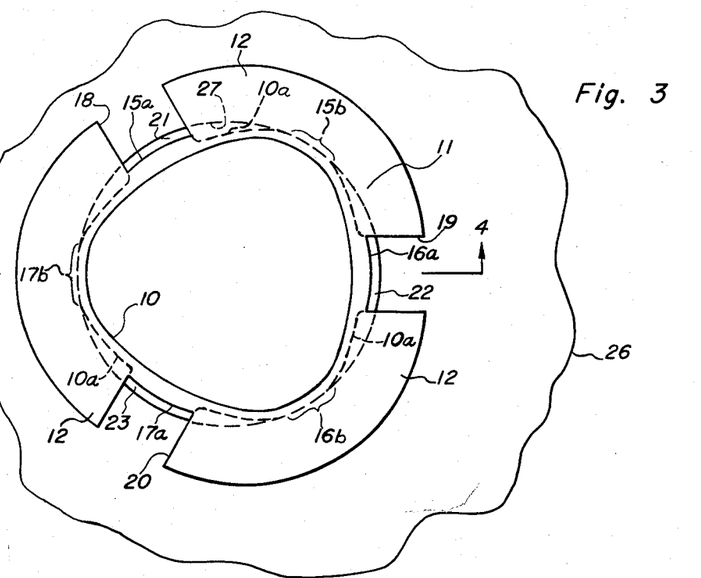
Figure 4:
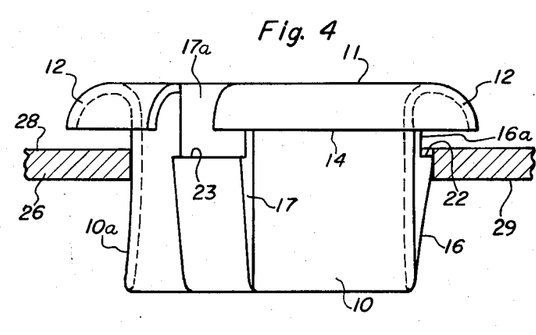
FIGS. 4, 6 and 8 are views partly in elevation and partly in section, the sections being taken respectively on line 4—4 in FIG. 3, line 6—6 in FIG. 5, and line 8—8 in FIG. 7.

Important to note is the structural behavior of the relatively flexible body portion 10 as the bushing reaches and passes through the initial stage or position shown in FIGS. 3 and 4. The high ends of ribs 15, 16 and 17 respectively at steps 21, 22 and 23, being normally on a circumference substantially greater than the hole diameter, are engaged quite firmly with the edge of the hole, thus to distort body portion 10 as shown in FIG. 4. The normal diameter of the outside cylindrical surface 10a is such that in this position the three outside surface areas, designated at 15b, 16b and 17b, lightly engage the edge of the hole 27, the intervening surfaces being clear of the edge of the hole, as shown by the dash lines 10a and 27, in FIG. 3.

Figure 5:
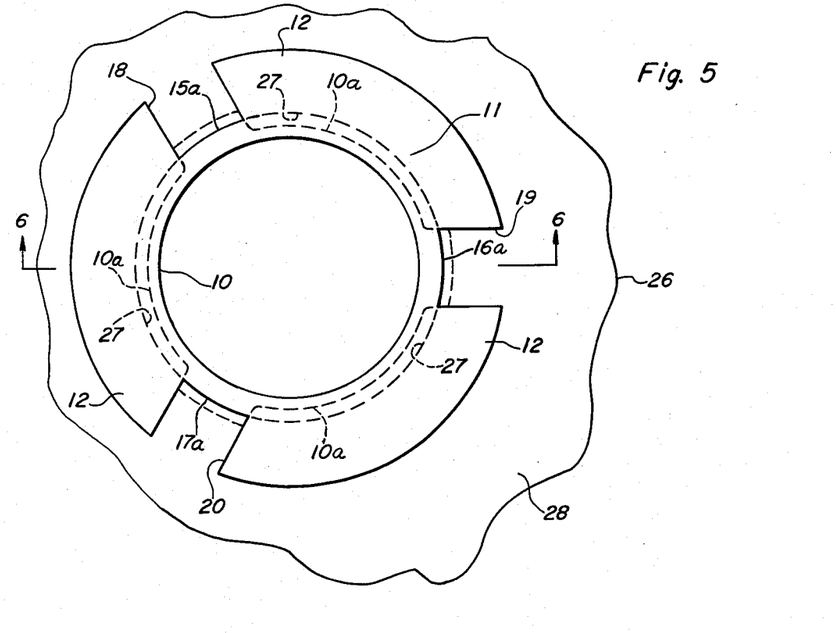
Figure 6:
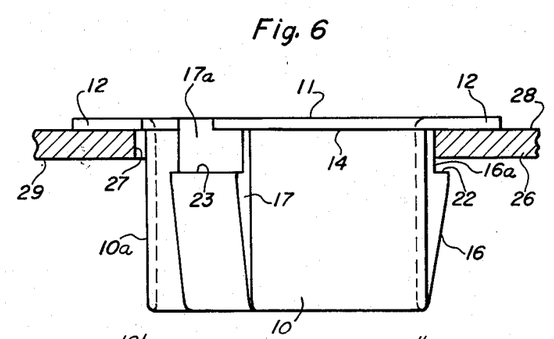

With the bushing pushed "home" as shown in FIGS. 5 and 6, the relatively flexible head 11 which also has a relatively high degree of springiness, is fully sprung to be substantially flat against the adjacent face 28 of plate 26. The surfaces or steps 21, 22 and 23 now are well beyond and spaced from the under or far side 29 of plate 26. The bushing-centering surfaces 15a, 16a and 17a, being on a cylindrical surface whose diameter is about equal to that of hole 27, now engage the edge of the hole relatively lightly. The relatively flexible body portion 10 which has a degree of springiness, having thus been released from the "squeeze" previously causing the distortion as shown by dash line 10a in FIG. 3, now will have assumed its normal, cylindrical shape as shown by dash line 10a in FIG. 5. This restoration of body shape takes place instantly and in a springlike manner as the respective outside edges of surfaces or steps 21, 22 and 23 clear the relatively sharp edge of hole 27 and ribs 15, 16 and 17 spring radially outwardly with a snap action, in the manner of the conventional doorlatch. It is this snap action, and the basic characteristics of material and structural features herein to cause the same, which is meant by the term "snap-in" when reference is made to our improved bushing as being a "snap-in" bushing.

After the above "snap-in" action, the thumb or tool is disengaged to remove the force previously applied against head 11, thus to permit the flattened head to spring back to substantially its normal shape as shown in FIG. 2, but not quite to this extent because of the planes 24 and 25 being spaced, as aforesaid, a distance less than the thickness of the chassis or panel plate 26. This expedient, taken with the relatively strong spring action and the shape and dimensions of head 11, provides for substantial thrust of surfaces 14 against the adjacent side or face 28 of plate 26; such thrust being balanced by the equal and oppositely-directed thrust of surfaces or steps 21, 22 and 23 against the other side 29 of plate 26.

Figure 7:
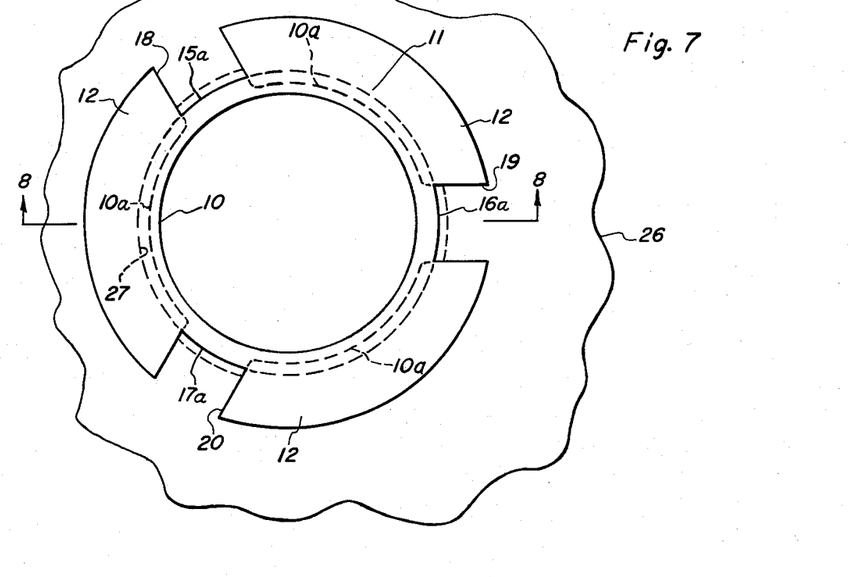
Figure 8:
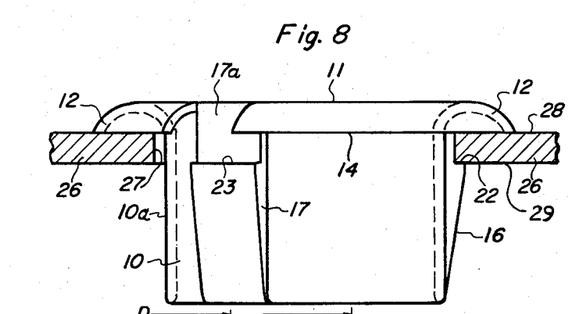

It will be seen from the foregoing that with the bushing assembled as in FIGS. 7 and 8, it is securely locked to the plate and can not come out, and that on account of the engagement of surfaces 15a, 16a and 17a with the edge of hole 27, the bushing is held centered in the hole and firmly so, with the outside surface 10a of body portion 10 spaced from or clear of the edge of the hole, as shown in FIG. 8 and by the dash lines 10a and 27 in FIG. 7.

Figure 4A:
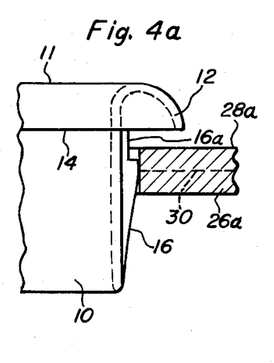
FIGS. 4a, 6a and 8a are illustrative of the range of adaptability of the bushing for different thicknesses of plate and are fragmentary views similar, respectively, to FIGS. 4, 6 and 8.
Figure 6A:
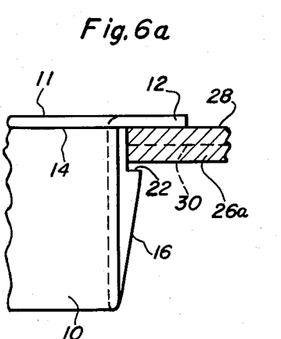
Figure 8A:
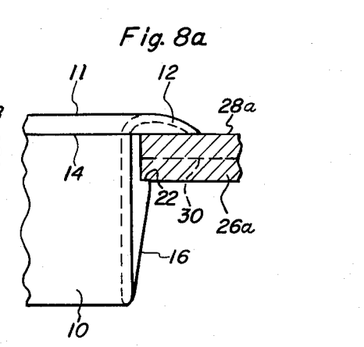

The same size bushing, i.e., one designed or dimensioned for a hole of a given diameter, can adapt itself to and can accommodate plates of substantially different thicknesses. This advantage is illustrated in FIGS. 4a, 6a and 8a wherein the thickness of plate 26a is shown to be substantially greater than that of plate 26. The action in assembly is identical to that in FIGS. 4, 6 and 8, except that due to the greater thickness of plate 26a and head 11, as illustrated in FIG. 8a, remains sprung to a slightly greater extent than is the case in FIG. 8, and the grip or hold on the plate is proportionately greater, as will be well understood. This operational action suggests an added advantage which resides in the fact that the greater thickness might be because of two or more plates being held together, face-to-face, as represented by the dash line 30 in FIG. 8a. Thus, our improved bushing can function in the manner of a rivet to hold two or more plates together, face-to-face, and firmly so. For some uses or applications it might be required that after assembly there is permissible some rotary movement of either plate in its own plane and relatively with respect to the other plate or plates. Our improved bushing permits this, which in some cases might be important for adjustment of the plates to facilitate the carrying out of a subsequent assembly or mass-production step.

Without the provision of any notches in head 11, such as the notches 18, 19 and 20, our improved bushing would, to an extent satisfactory for some applications, still be functional in the manner and for the purposes explained, while still having embodied therein one or more aspects of our invention as claimed herein. Use of the notches has a bearing upon material used and the dimensions and cross-sectional U-configuration of head 11, i.e., the latter giving high resistance against bending or crosswise distortion, as in the case of the conventional U-beam for structures. The three notches shown divide head 11 and its flange 12 into three equal segments, each embracing less than 120°. In the position shown in FIGS. 3 and 4 the notched head and flange, therefore, offer no appreciable resistance to the necessary distortion of body portion 10. Furthermore, each of the three, structurally-independent segments flattens or fans out as in FIGS. 5 and 6; more easily than would otherwise be the case. Still further, use of the notches and their disposition to be in alignment, respectively, with ribs 15, 16 and 17, makes possible the use of a straight mold for automatic operation in manufacture by injection molding.

Figure 1A:
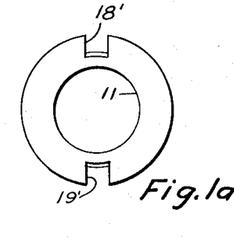
FIGS. 1a and 1b are plan views illustrative of modifications, each being on a reduced scale and similar to FIG. 1.
Figure 1B:
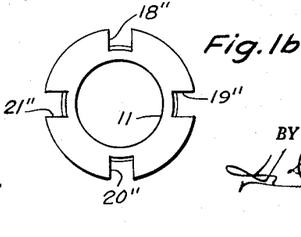

The structural and operational features in FIGS. 1a and 1b are identical to those in FIGS. 1 to 8 and in FIGS. 4a, 6a and 8a, exceptions being that in FIG. 1a there are the two notches 18' and 19' disposed diametrically-opposite to each other, and in FIG. 1b there are the four notches 18", 19", 20" and 21" each spaced 90° from the notch to either side of the same.

It will be seen that our improved bushing provides for complete insulation around the hole 27 on account of being a "non-split" bushing. In other words, the body portion 10 and head 11 are solid or continuous throughout 360°, as viewed in FIG. 1.

Figure 4B:
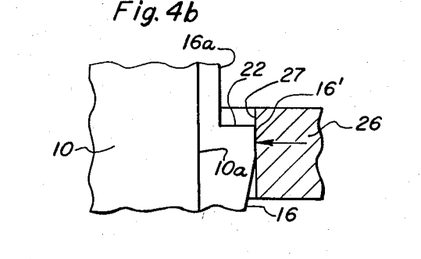
FIG. 4b is a fragmentary view taken from FIG. 4 and three times the scale in the latter, and is illustrative of a detail of structure and arrangement.

The ribs 15, 16 and 17, as indicated in FIG. 2, have a ten-degree taper in the direction toward the end 10b of body portion 10, thus to facilitate entrance of the bushing into hole 27. The three outside cam surfaces thus provide considerable leverage or force-multiplication as in the use of a wedge, and minimize extent of effort necessary to force or to push the bushing all the way through hole 27, to the position shown in FIGS. 5 and 6. The high parts of these cam surfaces immediately adjacent to the locking or latch surfaces or steps 21, 22 and 23, such as the high part 16' shown in FIGS. 4b and 8b, might be on the surface of a cylinder whose axis is parallel to or coincident with that of the bushing, thus to give substantial area of engagement or contact with the edge of hole 27 at the time when the pressure, indicated by the arrow in FIG. 4b, is greatest because of the greatest distortion of and the greatest stress in body portion 10 when the latter is as shown in FIGS. 3, 4 and 4a.

With regard to satisfactory dimensions in inches and some relations of one dimension to another, those considered to be satisfactory or adequate for a bushing for a half-inch hole in chassis or similar plate are, approximately, as follows. The inside and outside diameters of body portion 10 to be, respectively, .425 and .461; the edge of flange 12 to be on a circle whose diameter is .677; the width of each notch to be .125; the length or longitudinal extent of the bushing to be .328; the distance between planes 24 and 25 to be .020; the surfaces 15a, 16a and 17a to be on a cylinder whose diameter is .500; the taper of ribs 15, 16 and 17 to be 10°; the radius R of curvature of the 90° extent of the arcuate cross-sectional configuration of head 11 from the outside edge of flange 12 to the wall of body portion 10 to be .060; and the radius r of curvature of such configuration immediately adjacent to the 90° arc to be .030.

Figure 8B:
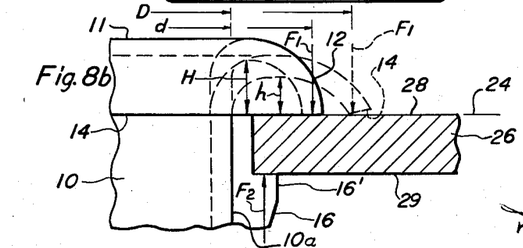
FIG. 8b is a fragmentary view taken from FIG. 8 and about twice the scale in the latter, and is explanatory of the significance of relation of one dimension to another in our improved bushing.

FIG. 8b is more clearly illustrative of the better operating action possible and the advantages generally in the use of our improved bushing as compared with some of the bushing or grommet designs proposed heretofore. Such better operating action and advantages can be attributed to the joint effects or results of dimensions or relation of dimensions one to the other and the aforesaid characteristics of flexibility and springiness of the material of which the bushing is made. For example, with the bushing assembled with chassis or panel plate 26 of usual thickness and head 11 and flange 12 in the full-line position shown, the total downwardly-directed force $F_1$ represented by the full-line arrow equals the total upwardly-directed force represented by the arrow $F_2$, and the span or spread of head 11 and flange 12 thereof is in amount the distance $d$ of the center of area of locking surface 14 radially outwardly from the outside surface 10a of body portion 10. The lesser radius $r$ indicated in FIG. 2 provides a degree of springiness substantially greater than would otherwise be the case, thus to hold the head and flange substantially as shown, with surface 14 substantially flush or flat against the top surface 28 of plate 26.

With the bushing assembled with chassis or panel plate 26a of thickness greater than usual, as shown in FIG. 8a, and with head 11 and flange 12 thereof accordingly in the dash-line position shown in FIG. 8b, the total downwardly-directed force represented by the dash-line arrow will be the same as before but the distance $d$ will have increased to the distance D. Although surface 14 now is not as flush or as flat against the top surface 28 of plate 26, the lesser radius $r$ provides the greater degree of tension necessary to maintain force $F_1$ equal to the oppositely-directed force $F_2$.

In the use of a given size of our improved bushing with plate of different thicknesses it occurs that each of the ratios D to $d$ and H to $h$ can vary over a substantial range, the action being such that with the same size bushing assembled with plates substantially different in thickness, the ratio of D to $d$ is at least 4 to 3 and the ratio of H to $h$ is at least 7 to 4. Considered from another viewpoint, it will be seen that the extent of difference of plate thickness which there can be for any one size of our improved bushings to be functional; is the extent of maximum height H of the inside surface of head 11 from the plane 24 of locking surface 14. As shown in FIG. 8b, with distance $d$ increased to the distance D, the previous height H will have decreased to the height $h$. The range or extent of plate thickness possible for a given size bushing is determined by the possible difference between H and $h$, it being noted that when plate thickness is about equal to the maximum height H the head 11 and flange 12 thereof are spread or fanned out substantially flat, as in FIGS. 5, 6 and 6a. In such case, $h$ is zero and D is maximum. Throughout the full range of flexure of head 11 and flange 12 thereof, i.e., from the full-line position shown in FIG. 8b whereat $d$ is about the same as in FIG. 2 to the extreme position shown in FIGS. 6 and 6a whereat $h$ is zero; the lesser radius $r$ provides that there is always sufficient springiness and tension at the juncture of head 11 with the wall of body portion 10 to carry the load, the latter in any case being the torque or moment equal to $F_1$ multiplied by the span or lever arm such as D or $d$.

The choice of number of notches such as the three shown in FIG. 1, the two shown in FIG. 1a, and the four shown in FIG. 1b; is an expedient for control of the extent or magnitude of force $F_1$ and the corresponding amount of permissible stress in the area of radius $r$. It will be understood that other factors to be considered and which are jointly contributive for the best operating action with a particular gauge or thickness of plate 26 or comparable structure; are respective values of $r$, $d$, the thickness of head 11 and flange 12 thereof, and the aforesaid physical characteristics of the material of which the bushing is made.

Reference is now made particularly to the upper right-hand portion of FIG. 2. In any one of the embodiments of our invention disclosed herein and in which head 11 is provided with one or more ribs such as the two ribs and the two notches 18' and 19' aligned respectively with the latter as in FIG. 1a, the three ribs 15, 16 and 17 and the three notches 18, 19 and 20 aligned respectively with the latter as in FIG. 1, and the four ribs and the four notches 18", 19", 20" and 21" aligned respectively with the latter as in FIG. 1b; there is, at that end of each rib adjacent to head 11, the distinctive L-shape shown more clearly in FIG. 2. In the case of rib 16 and notch 19 aligned with the same, the surface portion 16a forms the vertical and longer leg of the L and the locking surface 22 perpendicular to surface portion 16a forms the shorter leg of the L. In other words, in one form of our invention as claimed herein that portion of the outside surface of the bushing from the outside surface of head 11 and thence longitudinally of the bushing to and including the second locking surface 22, is L-shape.

As shown more clearly in FIGS. 1, 2, 4, 8 and 8b, the plate-engaging surface 14 extends radially outwardly beyond the radial extent of the plate-engaging surfaces 21, 22 and 23 and is directed or positioned toward the end 10b of body portion 10.

In the claims, the terms "plate" and "wall structure" are used in the broad sense and are inclusive with respect to applications such as the assembly of our improved bushing with the base, handle, cover, or other areas of electrical appliances or other devices wherein either or both of the opposite faces or surfaces, such as surfaces 28 and 29 of plate 26, might not be exactly flat or exactly in planes parallel to each other; and wherein the hole 27, instead of being punched out, might be cast in or otherwise provided for.

The novel features of structure and operation of the mold which make possible and practical the manufacture of bushings embodying our invention as disclosed and claimed herein, are claimed in our application copending herewith, filed December 31, 1959, and given Serial No. 863,370.

We claim as our invention:

1. A bushing of the character described for insertion into and through a hole with which a plate is provided; the material of said bushing having a relatively high value of electrical resistance and being relatively flexible and having a flexural modulus of the order of substantially 175,000 pounds per square inch, said bushing having a substantially cylindrical body portion hollow end-to-end thereof, first and second locking means provided respectively with first and second plate-engaging surfaces, said first and second locking means being disposed in opposition with respect to each other in the sense that said plate-engaging surfaces thereof are disposed for engagement respectively with the opposite sides of said plate at said hole, said first and second plate-engaging surfaces being disposed respectively in first and second planes each substantially perpendicular to the longitudinal axis of said body portion and spaced one from the other a distance less than the thickness of said plate at said hole, said first locking means being disposed at one end of said body portion and being in the form of a relatively flexible head having an arcuate cross-sectional configuration and a substantially circular edge, the peripheral surface of said edge constituting said first plate-engaging surface, said second locking means being in the form of at least two ribs spaced from each other in the direction circumferentially of said body portion and each raised from the outside cylindrical surface of said body portion to extend radially outwardly therefrom and each extending longitudinally of said body portion from substantially the other end of the latter to said relatively flexible head, said head being provided through the same with U-shape notches, each of said notches being radially disposed with respect to the longitudinal axis of said body portion and extending to said substantially circular edge of said head, said notches being aligned respectively with said ribs, those parts of the outside surfaces of said ribs each between said second plate-engaging surfaces and said head being disposed substantially in a cylinder the axis of which is substantially coincident with the axis of said outside cylindrical surface of said body portion and the diameter of which is substantially the same as the diameter of said hole thus to make said outside surface parts of said ribs functional jointly to hold said bushing centered in said hole when said bushing is in assembled relation with said plate and locked to the latter by virtue of said first and second plate-engaging surfaces then being engaged respectively with the opposite sides of said plate at said hole, said first plate-engaging surface extending radially outwardly beyond the radial extent of said second plate-engaging surfaces.

2. The assembly comprising a plate having a substantially circular hole therethrough, and a bushing disposed in and extending through said hole; the material of said bushing having a relatively high value of electrical resistance and being relatively flexible and having a flexural modulus of the order of substantially 175,000 pounds per square inch, said bushing having a substantially cylindrical body portion hollow end-to-end thereof, first and second locking means provided respectively with first and second plate-engaging surfaces, said first and second locking means being disposed in opposition with respect to each other in the sense that said plate-engaging surfaces thereof engage respectively the opposite sides of said plate at said hole, said first locking means being disposed at one end of said body portion and being in the form of a relatively flexible head having an arcuate cross-sectional configuration and a substantially circular edge, the peripheral surface of said edge constituting said first plate-engaging surface, said second locking means being in the form of at least two ribs spaced from each other in the direction circumferentially of said body portion and each raised from the outside cylindrical surface of said body portion to extend radially outwardly therefrom and each extending longitudinally of said body portion from substantially the other end of the latter to said relatively flexible head, said head being provided through the same with U-shape notches, each of said notches being radially disposed with respect to the longitudinal axis of said body portion and extending to said substantially circular edge of said head, said notches being aligned respectively with said ribs, the outside diameter of said body portion at said plate being less than the diameter of said hole and to an extent positioning the outside cylindrical surface of said body portion at said plate spaced from the latter, those parts of the outside surfaces of said ribs each between said second plate-engaging surfaces and said relatively flexible head being engaged with said plate at areas around said hole thus holding said bushing centered in said hole with said outside cylindrical surface of said body portion at said plate spaced from the latter as aforesaid, said first plate-engaging surface extending radially outwardly beyond the radial extent of said second plate-engaging surfaces.

3. An insulating and self-locking bushing of the character described; said bushing being made of relatively flexible material, said bushing comprising a substantially cylindrical body portion hollow end-to-end thereof and non-split in the sense that the wall structure of said body portion is solid throughout 360° circumferentially about the longitudinal axis of said body portion, said body portion at one end thereof and integral therewith being provided with a relatively flexible head, the outside edge portion of said head being in the form of a flange the outside edge of which is positioned toward the other end of said body portion, said body portion being provided with locking steps protruding radially outwardly from its outside surface and being disposed to be complementary with respect to said outside edge of said flange whereby after assembly of said bushing said locking steps and said outside edge of said flange function to hold said bushing locked in the operating position thereof, said outside edge of said flange extending radially outwardly beyond the radial extent of said locking steps.

4. An insulating and self-locking bushing of the character described; said bushing being made of relatively flexible material, said bushing comprising a substantially cylindrical body portion hollow end-to-end thereof and non-split in the sense that the wall structure of said body portion is solid throughout 360° circumferentially about the longitudinal axis of said body portion, said body portion at one end thereof and integral therewith being provided with a relatively flexible head, the outside edge portion of said head being in the form of a flange the outside edge of which is positioned toward the other end of said body portion, said body portion being provided with locking steps protruding radially outwardly from its outside surface and being disposed to be complementary with respect to said outside edge of said flange whereby after assembly of said bushing said locking steps and said outside edge of said flange function to hold said bushing locked in the operating position thereof, the cross-sectional configuration of the head-end of said bushing being arcuate and extending through substantially 180° from said outside edge of said flange to the wall of said body portion, said outside edge of said flange extending radially outwardly beyond the radial extent of said locking steps.

5. An insulating and self-locking bushing of the character described; said bushing being made of relatively flexible material, said bushing comprising a substantially cylindrical body portion hollow end-to-end thereof and non-split in the sense that the wall structure of said body portion is solid throughout 360° circumferentially about the longitudinal axis of said body portion, said body portion at one end thereof and integral therewith being provided with a relatively flexible head, the outside edge portion of said head being in the form of a flange the outside edge of which is positioned toward the other end of said body portion, said body portion being provided with locking steps protruding radially outwardly from its outside surface and being disposed to be complementary with respect to said outside edge of said flange whereby after assembly of said bushing said locking steps and said outside edge of said flange function to hold said bushing locked in the operating position thereof, the cross-sectional configuration of the head-end of said bushing being arcuate and extending through substantially 180° from said outside edge of said flange to the wall of said body portion, the average radius of curvature of substantially the 90°-extent of said configuration from said outside edge of said flange being substantially greater than the average radius of curvature of said configuration immediately adjacent to said substantially 90°-extent of said configuration, said outside edge of said flange extending radially outwardly beyond the radial extent of said locking steps.

6. A self-locking bushing of the character described; said bushing comprising a substantially cylindrical body portion hollow end-to-end thereof and non-split in the sense that the wall structure of said body portion is solid throughout 360° circumferentially about the longitudinal axis of said body portion, said body portion at one end thereof and integral therewith being provided with a relatively flexible head, the outside edge portion of said head being in the form of a flange the outside edge of which is positioned toward the other end of said body portion thus to provide a first locking surface, said body portion being provided with at least one locking step protruding radially outwardly from its outside surface thus to provide at least one second locking surface directed toward said first locking surface and otherwise disposed to be complementary with respect to said first locking surface whereby after assembly of said bushing for an intended purpose thereof said first and second locking surfaces are functional jointly to hold said bushing locked in the operating position of the same, the normal cross-sectional configuration of the head-end of said bushing being arcuate and sufficiently so to place said first locking surface a distance $d$ radially outwardly from the outside surface of said body portion and to give to the inside surface of said head a maximum height of H from the plane of said first locking surface, said dimensions $d$ and H and characteristics of flexibility and springiness of the material of which said bushing is made being related in the sense that the same are jointly contributive to permit flexure of said head to an extent to increase said distance $d$ to a distance D and simultaneously to decrease said height of H to a height of $h$ and to respective extents whereby after such flexure the ratio of D to $d$ is at least 4 to 3 and the ratio of H to $h$ is at least 7 to 4, said first locking surface extending radially outwardly beyond the radial extent of said second locking surface.

7. A self-locking bushing of the character described; said bushing comprising a substantially cylindrical body portion hollow end-to-end thereof and non-split in the sense that the wall structure of said body portion is solid throughout 360° circumferentially about the longitudinal axis of said body portion, said body portion at one end thereof and integral therewith being provided with a relatively flexible head, the outside edge portion of said head being in the form of a flange the outside edge of which is positioned toward the other end of said body portion thus to provide a first locking surface, said body portion being provided with at least one locking step protruding radially outwardly from its outside surface thus to provide at least one second locking surface directed toward said first locking surface and otherwise disposed to be complementary with respect to said first locking surface whereby after assembly of said bushing for an intended purpose thereof said first and second locking surfaces are functional jointly to hold said bushing locked in the operated position of the same, the normal cross-sectional configuration of the head-end of said bushing being arcuate and sufficiently so to place said first locking surface a distance $d$ radially outwardly from the outside surface of said body portion and to give to the inside surface of said head a maximum height of H from the plane of said first locking surface, said dimensions $d$ and H and characteristics of flexibility and springiness of the material of which said bushing is made being related in the sense that the same are jointly contributive to permit flexure of said head to an extent to increase said distance $d$ to a distance D and simultaneously to decrease said height of H to a height of $h$ and to respective extents whereby after such flexure the ratio of D to $d$ is at least 4 to 3 and the ratio of H to $h$ is at least 7 to 4, said relatively flexible head being provided through the same with a U-shape notch radially disposed with respect to the longitudinal axis of said body portion and extending to said first locking surface, said notch being aligned with said second locking surface considered in the direction longitudinally of said body portion, said first locking surface extending radially outwardly beyond the radial extent of said second locking surface.

8. A self-locking bushing comprising a relatively flexible body portion hollow end-to-end thereof and non-split in the sense that the wall structure of said body portion is continuous throughout 360° circumferentially about the longitudinal axis of said body portion, said body portion at one end thereof being provided with a relatively flexible head, the outside edge portion of said head being in the form of a flange the outside edge of which is positioned toward the other end of said body portion thus to provide a first locking surface, said body portion being provided with at least one locking step protruding radially outwardly from its outside surface thus to provide at least one second locking surface directed toward said first locking surface and otherwise disposed to be complementary with respect to said first locking surface whereby after assembly of said bushing for an intended purpose thereof said first and second locking surfaces are functional jointly to hold said bushing locked in the operating position of the same, said relatively flexible head being provided through the same with a notch radially disposed with respect to the longitudinal axis of said body portion and extending to said first locking surface, said first locking surface extending radially outwardly beyond the radial extent of said second locking surface.

9. A self-locking bushing comprising a relatively flexible body portion hollow end-to-end thereof and non-split in the sense that the wall structure of said body portion is continuous throughout 360° circumferentially about the longitudinal axis of said body portion, said body portion at one end thereof being provided with a relatively flexible head, the outside edge portion of said head being in the form of a flange the outside edge of which is positioned toward the other end of said body portion thus to provide a first locking surface, said body portion being provided with at least one locking step protruding radially outwardly from its outside surface thus to provided at least one second locking surface directed toward said first locking surface and otherwise disposed to be complementary with respect to said first locking surface whereby after assembly of said bushing for an intended purpose thereof said first and second locking surfaces are functional jointly to hold said bushing locked in the operating position of the same, the normal cross-sectional configuration of the head-end of said bushing being arcuate and sufficiently so to place said first locking surface a distance $d$ radially outwardly from the outside surface of said body portion and to give to the inside surface of said head a maximum height of $H$ from the plane of said first locking surface, said dimensions $d$ and $H$ and characteristics of flexibility and springiness of the material of which said bushing is made being related in the sense that the same are jointly contributive to permit flexure of said head to an extent to increase said distance $d$ to a distance $D$ and simultaneously to decrease said height of $H$ to a height of $h$ and to respective extents whereby after such flexure the ratio of $D$ to $d$ is at least 4 to 3 and the ratio of $H$ to $h$ is at least 7 to 4, said first locking surface extending radially outwardly beyond the radial extent of said second locking surface.

10. A self-locking bushing comprising a relatively flexible body portion hollow end-to-end thereof and non-split in the sense that the wall structure of said body portion is continuous throughout 360° circumferentially about the longitudinal axis of said body portion, said body portion at one end thereof being provided with a relatively flexible head, the outside edge portion of said head being in the form of a flange the outside edge of which is positioned toward the other end of said body portion thus to provide a first locking surface, said body portion being provided with at least one locking step protruding radially outwardly from its outside surface thus to provide at least one second locking surface directed toward said first locking surface and otherwise disposed to be complementary with respect to said first locking surface whereby after assembly of said bushing for an intended purpose thereof said first and second locking surfaces are functional jointly to hold said bushing locked in the operating position of the same, said relatively flexible head being provided through the same with three notches each radially disposed with respect to the longitudinal axis of said body portion and each extending to said first locking surface, each of said notches in the direction circumferentially of said head being spaced substantially 120° from the notch to either side of the same, said first locking surface extending radially outwardly beyond the radial extent of said second locking surface.

11. A self-locking bushing comprising a relatively flexible body portion hollow end-to-end thereof and non-split in the sense that the wall structure of said body portion is continuous throughout 360° circumferentially about the longitudinal axis of said body portion, said body portion at one end thereof being provided with a relatively flexible head, the outside edge portion of said head being in the form of a flange the outside edge of which is positioned toward the other end of said body portion thus to provide a first locking surface, said body portion being provided with at least one locking step protruding radially outwardly from its outside surface thus to provide at least one second locking surface directed toward said first locking surface and otherwise disposed to be complementary with respect to said first locking surface whereby after assembly of said bushing for an intended purpose thereof said first and second locking surfaces are functional jointly to hold said bushing locked in the operating position of the same, that portion of the outside surface of said bushing from the outside surface of said head and thence longitudinally of said bushing to and including said second locking surface being L-shaped.

12. A self-locking bushing of the type functional to be installed or assembled by the application thereto of a force directed only substantially axially with respect to its longitudinal axis; said bushing comprising a relatively flexible body portion hollow end-to-end thereof and non-split in the sense that the wall structure of said body portion is solid and continuous throughout 360° circumferentially about the longitudinal axis of said body portion, said bushing having means for retaining itself within an apertured panel, said body portion at one end thereof being provided with a relatively flexible head, the outside edge portion of said head constituting part of said bushing-retaining means and being in the form of a relatively flexible flange the outside edge of which is positioned toward the other end of said body portion thus to provide a first locking surface, said body portion being provided with a locking step constituting another part of said bushing-retaining means and being in this respect complementary to said first-named part, said locking step protruding radially outwardly from the outside surface of said body portion thus to provide a second locking surface directed toward said first locking surface, said head being provided through the same with a notch radially disposed with respect to the longitudinal axis of said body portion and extending to said first locking surface, said first locking surface extending radially outwardly beyond the radial extent of said second locking surface.

13. A self-locking bushing of the type functional to be installed or assembled by the application thereto of a force directed only substantially axially with respect to its longitudinal axis; said bushing comprising a relatively flexible body portion hollow end-to-end thereof and non-split in the sense that the wall structure of said body portion is solid and continuous throughout 360° circumferentially about the longitudinal axis of said body portion, said bushing having means for retaining itself within an apertured panel, said body portion at one end thereof being provided with a relatively flexible head, the outside edge portion of said head constituting part of said bushing-retaining means and being in the form of a relatively flexible flange the outside edge of which is positioned toward the other end of said body portion thus to provide a first locking surface, said body portion being provided with locking steps constituting another part of said bushing-retaining means and being in this respect complementary to said first-named part, said locking steps protruding radially outwardly from the outside surface of said body portion thus to provide second locking surfaces directed toward said first locking surface, said first locking surface extending radially outwardly beyond the radial extent of said second locking surfaces, the degree of the aforesaid flexibility of said body portion being in extent sufficient to give to said body portion the characteristic of being readily distortable out of its normal cross-sectional shape incidental to the application of said force as and for the purpose aforesaid.

14. A self-locking bushing of the type functional to be installed or assembled by the application thereto of a force directed only substantially axially with respect to its longitudinal axis; said bushing comprising a relatively flexible body portion hollow end-to-end thereof and non-split in the sense that the wall structure of said body portion is solid and continuous throughout 360° circumferentially about the longitudinal axis of said body portion, said bushing having means for retaining itself within an apertured panel, said body portion at one end thereof being provided with a relatively flexible head, the outside edge portion of said head constituting part of said bushing-retaining means and being in the form of a relatively flexible flange the outside edge of which is positioned toward the other end of said body portion thus to provide a first locking surface, said body portion being provided with locking steps constituting another part of said bushing-retaining means and being in this respect complementary to said first-named part, said locking steps protruding radially outwardly from the outside surface of said body portion thus to provide second locking surfaces directed toward said first locking surface, said first locking surface extending radially outwardly beyond the radial extent of said second locking surfaces, the degree of the aforesaid flexibility of said body portion being in extent sufficient to give to said body portion the characteristic of being readily distortable out of its normal cross-sectional shape incidental to the application of said force as and for the purpose aforesaid, the cross-sectional configuration of the head-end of said bushing being arcuate and extending through substantially 180° from said outside edge of said flange to the wall of said body portion, the average radius of curvature of substantially the 90°-extent of said configuration from said outside edge of said flange being substantially greater than the average radius of curvature of said configuration immediately adjacent to said substantially 90°-extent of said configuration.

15. A self-locking bushing of the type functional to be installed or assembled by the application thereto of a force directed only substantially axially with respect to its longitudinal axis; said bushing comprising a relatively flexible body portion hollow end-to-end thereof and non-split in the sense that the wall structure of said body portion is solid and continuous throughout 360° circumferentially about the longitudinal axis of said body portion, said bushing having means for retaining itself within an apertured panel, said body portion at one end thereof being provided with a relatively flexible head, the outside edge portion of said head constituting part of said bushing-retaining means and being in the form of a relatively flexible flange the outside edge of which is positioned toward the other end of said body portion thus to provide a first locking surface, said body portion being provided with locking steps constituting another part of said bushing-retaining means and being in this respect complementary to said first-named part, said locking steps protruding radially outwardly from the outside surface of said body portion thus to provide second locking surfaces directed toward said first locking surface, said head being provided through the same with at least two notches radially disposed with respect to the longitudinal axis of said body portion and extending to said first locking surface, said notches being aligned respectively with said second locking surfaces considered in the direction longitudinally of said body portion, said first locking surface extending radially outwardly beyond the radial extent of said second locking surfaces, the degree of the aforesaid flexibility of said body portion being in extent sufficient to give to said body portion the characteristic of being readily distortable out of its normal cross-sectional shape incidental to the application of said force as and for the purpose aforesaid, the cross-sectional configuration of the head-end of said bushing being arcuate and extending through substantially 180° from said outside edge of said flange to the wall of said body portion, the average radius of curvature of substantially the 90°-extent of said configuration from said outside edge of said flange being substantially greater than the average radius of curvature of said configuration immediately adjacent to said substantially 90°-extent of said configuration.

16. A self-locking bushing of the type functional to be installed or assembled by the application thereto of a force directed only substantially axially with respect to its longitudinal axis: said bushing comprising a relatively flexible body portion hollow end-to-end thereof and non-split in the sense that the wall structure of said body portion is solid and continuous throughout 360° circumferentially about the longitudinal axis of said body portion, said bushing having means for retaining itself within an apertured panel, said body portion at one end thereof being provided with a relatively flexible head constituting part of said bushing-retaining means and being in the form of a relatively flexible flange the outside edge of which is positioned toward the other end of said body portion thus to provide a first locking surface, said body portion being provided with at least one locking step constituting another part of said bushing-retaining means and being in this respect complementary to said first-named part, said locking step protruding radially outwardly from the outside surface of said body portion thus to provide at least one second locking surface directed toward said first locking surface and otherwise disposed to be complementary with respect to said first locking surface whereby after assembly of said bushing for an intended purpose thereof said first and second locking surfaces are functional jointly to hold said bushing locked in the operating position of the same, that portion of the outside surface of said bushing from the outside surface of said head and thence longitudinally of said bushing to and including said second locking surface being L-shape, the degree of the aforesaid flexibility of said body portion being in extent sufficient to give to said body portion the characteristic of being readily distortable out of its normal cross-sectional shape incidental to the application of said force as and for the purpose aforesaid.

References Cited in the file of this patent

UNITED STATES PATENTS

| | | |
|---|---|---|
| 1,743,493 | Sipe | Jan. 14, 1930 |
| 1,853,944 | Unke | Apr. 12, 1932 |
| 2,104,217 | Barnes | Jan. 4, 1938 |
| 2,668,316 | Sturtevant et al. | Feb. 9, 1954 |
| 2,818,559 | Manetti et al. | Dec. 31, 1957 |
| 2,912,712 | Shamban et al. | Nov. 17, 1959 |

FOREIGN PATENTS

| | | |
|---|---|---|
| 1,111,742 | France | Nov. 2, 1955 |

UNITED STATES PATENT OFFICE
CERTIFICATION OF CORRECTION

Patent No. 3,001,007                                           September 19, 1961

Ferdinand Klumpp, Jr., et al.

It is hereby certified that error appears in the above numbered patent requiring correction and that the said Letters Patent should read as corrected below.

Column 1, line 20, for the patent number "2,919,712" read -- 2,912,712 --; column 2, line 17, for "theh" read -- the --; column 4, line 50, for "and" read -- the --.

Signed and sealed this 24th day of April 1962.

(SEAL)
Attest:

ESTON G. JOHNSON
Attesting Officer

DAVID L. LADD
Commissioner of Patents